R. C. OGBURN.
MOLDING AND SETTING TABLE FOR PLASTIC BODIES.
APPLICATION FILED MAR. 28, 1911.
1,241,007.
Patented Sept. 25, 1917.
3 SHEETS—SHEET 1.
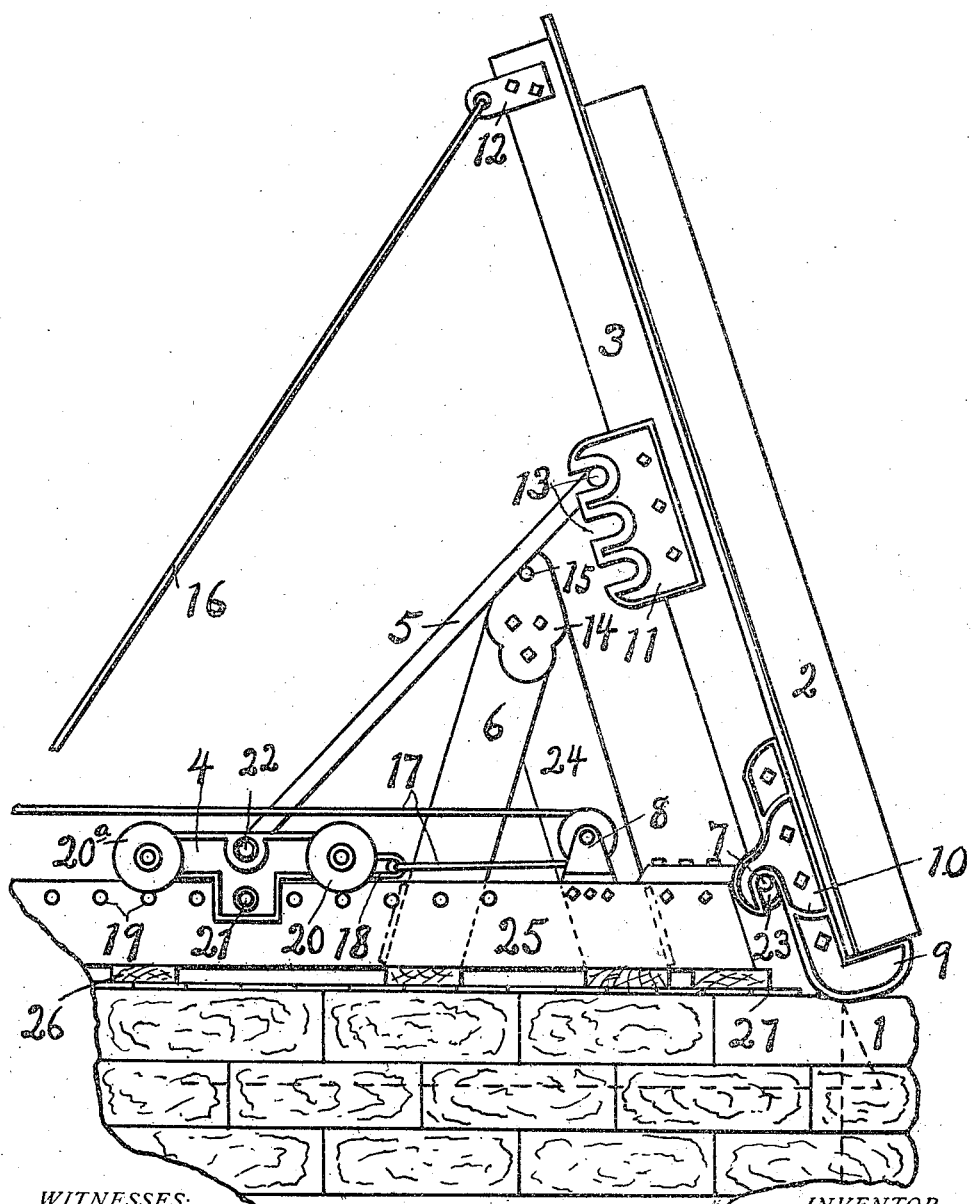
Fig. I.
WITNESSES:
INVENTOR.

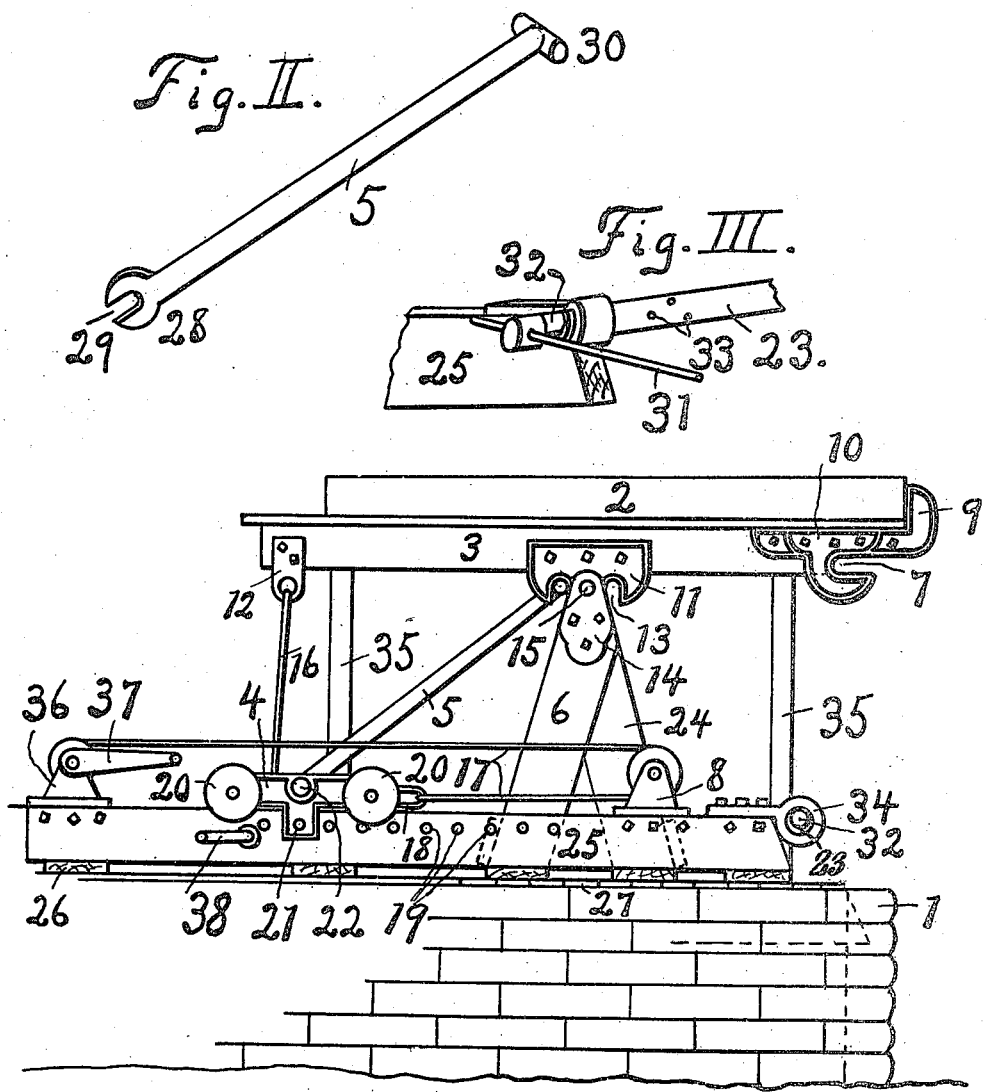

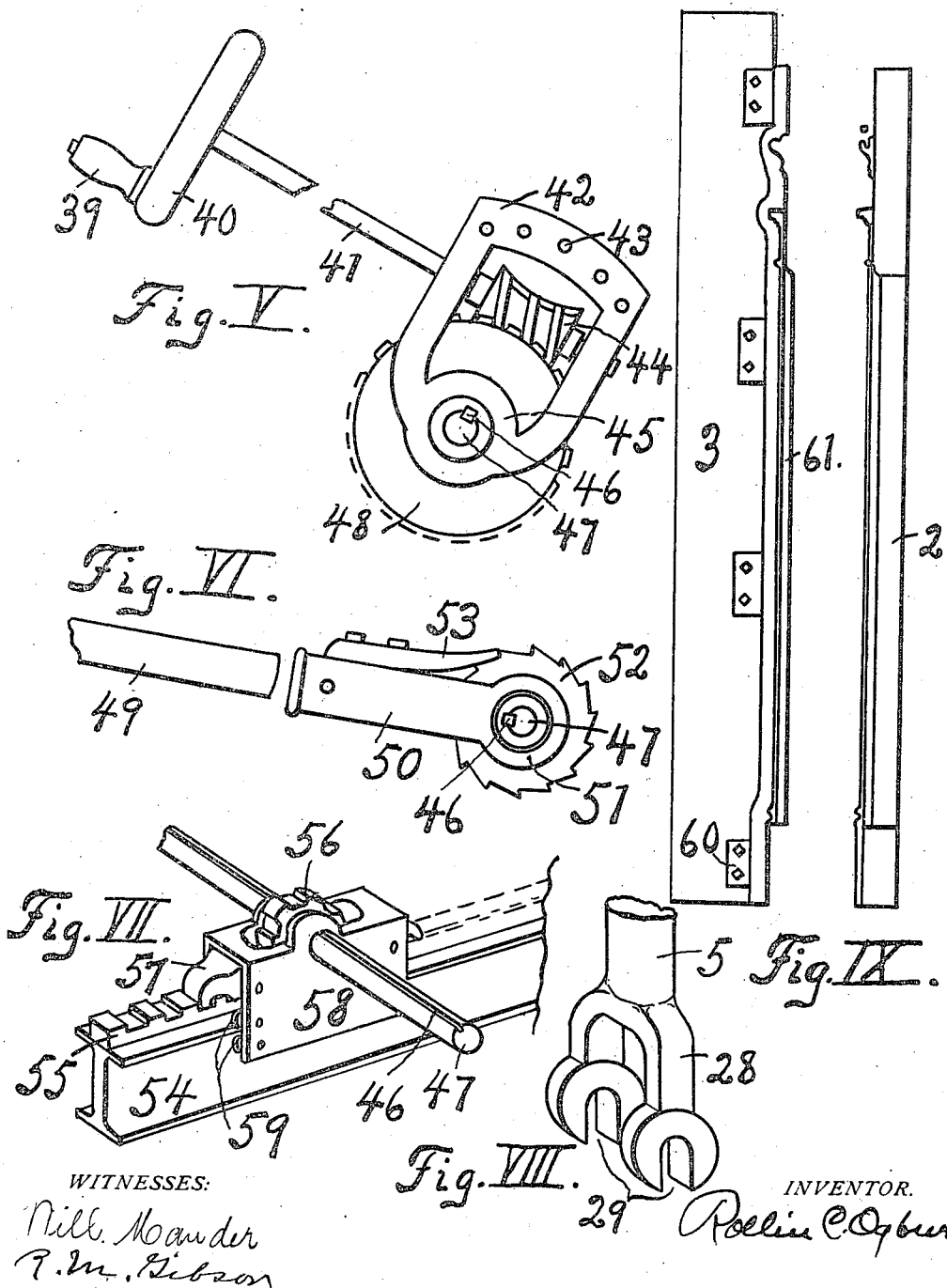

UNITED STATES PATENT OFFICE.

ROLLIN C. OGBURN, OF DES MOINES, IOWA.

MOLDING AND SETTING TABLE FOR PLASTIC BODIES.

1,241,007.  Specification of Letters Patent.  Patented Sept. 25, 1917.

Application filed March 28, 1911. Serial No. 617,502.

*To all whom it may concern:*

Be it known that I, ROLLIN C. OGBURN, a citizen of the United States, residing at Des Moines, in the county of Polk and State of Iowa, have invented new and useful Improvements in Molding and Setting Tables for Plastic Bodies, of which the following is a specification.

My invention relates to improvements in molding and setting tables for plastic bodies and more particularly to a table with an irregular movement produced by two pivotal supports, one on a line near the center and the other on a line near one edge of said table and to the means for handling said table and I do hereby declare the following to be a full and exact description thereof, reference being had to the accompanying drawings, which form a part of this specification.

The objects of my invention are: first, to provide two independent bearings for the table in order to handle the maximum of weight with the minimum of power; second, to provide means of lifting plastic bodies into an upright position with means of lowering said plastic bodies gently upon their foundations; third, to provide means of handling plastic or molded bodies, such as fireplace fronts, walls, partitions, wainscoting, sections of bridges, retaining walls, silo walls, concrete stairs, floor and roof slabs, and other molded bodies, of such simple construction and easy manipulation as to be available for common use without the necessity of technical ability or elaborate machinery.

My invention contemplates the use of a trestle with a shaft near its apex, upon which a table is pivoted near its center, bearings attached to the table near its base adapted to engage eccentric shafts attached to main base or frame, carriages adapted to move forward or back upon suitable carriage ways, lifting bars connecting said carriages and table, means of moving said carriages upon their run-ways and means of controlling the movement of the table.

In the drawings Figure I is a side elevation of a portion of my device showing plastic body, 2, table, 3, carriage, 4, lifting bar, 5, and lower pivot 7, and illustrating the method by which the body is elevated.

Fig. II— is a detail view of lifting bar.

Fig. III— is a detail view of the eccentric shaft.

Fig. IV— is a side elevation of my invention showing some of the parts of my device not shown in Fig. I. Fig. V— is a detail view of a substitute for Fig. VI. Fig. VI— is a detail view of an operating lever to be used in connection with carriage shown in Fig. VII. Fig. VII— is a detail view of a substitute carriage and runway. Fig. VIII— is a detail view of a portion of a substitute lifting bar.

Fig. IX is an end elevation of the plastic body, 2, form 61, in which same is molded and table, 3.

Inasmuch as my invention consists of a table, upon which cement or other plastic bodies may be molded in a horizontal position, said table having two lines of pivotal support, with carriages and lifting bars adapted to elevate said table to a vertical position by virtue of the forward movement of said carriages, and eccentric shafts adapted to engage the lower bearings of said table for the purpose of lowering said body by degrees to its final resting place, most all of which is operated by a suitable means of forcibly moving said carriages, I do not confine my invention to any particular means of moving said carriages. In Figs. V to VIII, I show a substitute means of moving the carriages. The carriages may also be moved forward by means of elongated jack screws, or by hydraulic or pneumatic power, or any other available means.

In Fig. IV the table, 3, is in a horizontal position. This is a position in which the body is molded. The method of procedure is as follows: Suitable bearings, 11, are fastened to the table near its center and preferably adjacent to its opposite sides in such a way that the larger part of the weight is on the side toward the foot. The table rests upon said bearings, which I term secondary bearings, and upon a plurality of shores or props, 35, 35, which may be of any suitable form or material. The table being firmly fixed in place and suitable forms erected thereon the plastic material is placed thereon and the process of molding is finished. The top of the body as molded being preferably the outside, when said body has been elevated, it becomes convenient to finish the outside of body any desirable way. The greater part of the weight being on the side toward the foot, after the shores are removed the table will tend to move from position as in Fig. IV toward the position as in Fig. I. A windlass 38, is attached to frame, 25 (Fig. IV) and its cables, 16, run to the upper part of the table and are attached thereto by suitable means, 12. This cable, which I term a check cable, and windlass are adapted to produce a gradual movement of the table until its lower bearings, 7, connects with shaft portion 32. When the table moves toward a vertical position the body, 2, is prevented from slipping down by stirrups, 9, which are fastened to the table. To these stirrups are removably attached parts, 10, adapted to engage the shaft portion 32, and form pivots which I term a primary bearing. The use of the primary and secondary pivots, I regard as one of the major elements of my invention. The table now resting on both pivots, the carriages, 4, are advanced by means of windlass, 36, and pulleys, 8, and cable, 17, which, through lifting bars, 5, causes the table to move on pivot, 7, toward a vertical position as shown in Fig. I. The body, 2, is retained on table by any suitable means.

After the table and body are forced to an approximately vertical position the final movement is produced by rotation of shaft, 23, which is shown in detail, in Fig. III. The bearings, 7, of the table rest upon the portions 32 of shaft 23, which portions 32 are eccentric Fig. III. The shaft 23 rotates in bearings which are attached to the frame, 25, by means of a rod which may pass through any one of several holes therein, as 33. One half rotation causes the eccentric shaft portion, 32, to pass from its highest to its lowest position. In settling a wall upon its foundation it is necessary for the wall to bear equally at every point. This may be accomplished by settling the wall into new concrete placed upon the foundation, so that the new concrete when it hardens will form a continuous support to wall.

In Fig. I a section of the foundation at 1, is removed to allow the stirrup, 9, to enter, and later put back in place. The carriage, 4, comprises a frame, with rollers, 20, and 20ᵃ, with holes, 21, through which a bolt may be passed through holes as at 19, to lock carriage to frame, 25. The carriage contains a shaft, 22, which engages with the lifting bar, 5. The trestle is indicated at 6 and 24, and the shaft, at 15, upon which the secondary bearing, 11, of the table rotates.

The table, trestle and lower frame may be constructed of wood planks such as are used in ordinary building, but metallic construction is preferred.

In Fig. VII a portion of the lower frame, 54, consists of an I beam. A rack, 55, and pinion, 56, are employed to move the carriage, 58, pawls, 57, being attached to said carriage. The shaft, 47, passes through both carriages and is keyed with gear wheel, 56. The lifting bar, 5, of which a portion is shown in Fig. VIII, rides on shaft, 47. It is obvious that any rotation of shaft, 47, will move the carriage and elevate the table. This shaft, 47, may be rotated by a lever shown in Fig. VI, in which the ratchet wheel, 52, is keyed at 46 to shaft, 47, and a pawl, 53, is adapted to rotate said ratchet wheel, 52. Any suitable handle or bar, 49 may be used. In Fig. V a substitute is shown in which a worm gear, 48, is keyed to shaft, 47, which rotates in bearing, 45. A worm, 44, is adapted to mesh with worm gear 48, and a wheel and shaft, 40 and 41, to rotate said worm gear. The whole is held to place by frame, 42, which may be bolted to carriage by any one of numerous holes, 43.

The outside or face of the wall or other plastic body, 2, being upward when molded, it is obvious than any exterior finish may be employed. The interior form of body, 2, may be goverened by forms or dies, 61, which may be attached to table, 3, in any suitable ways as bolts, 60. In this way any interior form and finish may be secured. It is similarly obvious that the device may be manipulated so that in molding position the outside of the body may be down and the inside up.

It will be apparent that with a table, having two primary bearings and one secondary bearing, likewise one carriage, run-way and lifting bar, a light body could be handled. The foregoing might be termed three point suspension. Similarly a table with two primary bearings and two secondary bearings might be termed four point suspension, and one having three of each of the bearings termed six point suspension. In case of a plurality of such bearings the shaft in both primary and secondary bearings would preferably extend the full length of the wall or body in order that the movement of said body might be uniform throughout its entire length. It will be obvious that the principles of my invention are unchanged by the use of a plurality of bearings. Two, three or four carriages with corresponding number of bearings at foot of table may be employed without departing from the invention.

The relative height of the trestle is not intended to be fixed; neither do I limit myself to a horizontal position of table at the time of casting the body. The construction and relative position of parts may be considerably varied without departing from the spirit of my invention, which I regard as residing in a table with two lines of pivotal support; means of elevating one edge of said table comprising carriages and lifting bars as illustrated; means of lowering table by degrees when in a near vertical position, and the combination with said table of suitable forms, cores and such.

What I claim as new and desire to secure by Letters Patent, is:—

1. In a molding and setting table for plastic bodies, the combination of a base, a trestle-like table support rising therefrom, a table fulcrumed thereon, stirrups and molding forms on said table, eccentric shaft portions mounted on said base, means for rotating said shaft portions, bearings positioned on said table to register with said shaft portions, other bearings centrally positioned on said table to register with said table support, with an actuating mechanism consisting of tracks laid on said base, carriages adapted to move thereon, lifting bars connected to said carriages and to the table, and means for moving and controlling the carriages.

2. In a molding and setting table for plastic bodies, a table provided with means for shaping and retaining plastic bodies relatively true to position and form together with means for actuating and controlling said table, in combination with a duplex supporting mechanism consisting of a primary axis comprising an eccentric shaft portion journaled on a base, and means for its rotation in conjunction with bearings marginally positioned on the table to register with said shaft portions, and a secondary axis comprising a shaft mounted on a trestle-like element in conjunction with bearings intermediately positioned on the table to register therewith.

3. In a molding and setting table for plastic bodies, the combination of a base, a support thereon, a table fulcrumed on said support, a shaft journaled on the base and having an eccentric portion, means on the table for engaging said eccentric shaft portion, means for rotating said shaft, a carriage movable on the base, lifting means interposed between the carriage and the table, and means for holding the carriage against casual movement.

4. In a molding and setting table for plastic bodies, a table provided with means for shaping and retaining plastic bodies relatively true to position and form together with means for controlling said table, in combination with duplex supporting mechanism consisting of a primary axis comprising an eccentric shaft portion mounted on a base and adapted to be rotated, means positioned on the table to engage said eccentric shaft portion, and a secondary axis comprising a shaft mounted on a support in conjunction with a bearing intermediately positioned on the table to engage the same.

ROLLIN C. OGBURN.

Witnesses:
Wm. E. Henry,
C. E. Pickering.

Copies of this patent may be obtained for five cents each, by addressing the "Commissioner of Patents, Washington, D. C."